US010867054B2

(12) United States Patent
Mai

(10) Patent No.: US 10,867,054 B2
(45) Date of Patent: *Dec. 15, 2020

(54) INFORMATION SECURITY/PRIVACY VIA A DECOUPLED SECURITY ACCESSORY TO AN ALWAYS LISTENING ASSISTANT DEVICE

(71) Applicant: Xiao Ming Mai, East Brunswick, NJ (US)

(72) Inventor: Xiao Ming Mai, East Brunswick, NJ (US)

(73) Assignee: Thomas Stachura, Edmonton (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/198,573

(22) Filed: Nov. 21, 2018

(65) Prior Publication Data

US 2019/0147173 A1 May 16, 2019

Related U.S. Application Data

(63) Continuation-in-part of application No. 16/010,725, filed on Jun. 18, 2018, which is a continuation-in-part
(Continued)

(51) Int. Cl.
*G06F 21/70* (2013.01)
*G06F 21/60* (2013.01)
(Continued)

(52) U.S. Cl.
CPC ........ *G06F 21/604* (2013.01); *G06F 21/6245* (2013.01); *H04W 12/00508* (2019.01);
(Continued)

(58) Field of Classification Search
CPC ....... G06F 21/71; G06F 9/4806; G06F 1/3206
See application file for complete search history.

(56) References Cited

U.S. PATENT DOCUMENTS 6,005,548 A 12/1999 Latypov et al.
6,252,544 B1 6/2001 Hoffberg
(Continued)

FOREIGN PATENT DOCUMENTS

CN 101604447 B 6/2011

OTHER PUBLICATIONS

Wagoner, Ara. "How to mute Google Home's microphones (and why you need to)". https://www.androidcentral.com/how-mute-google-homes-microphone-and-why-you-need.

*Primary Examiner* — Izunna Okeke
(74) *Attorney, Agent, or Firm* — Banner & Witcoff, Ltd.

(57) ABSTRACT

An always-listening-capable decoupled accessory for a computing device is disclosed. The accessory comprises an electronic sensor, configured to record user input comprising an utterance or gesture, and a gatekeeping module implemented by a processor, wherein all data received by the communications module based on data from the first electronic sensor passes through the gatekeeping module while a gatekeeping function is disabled, wherein no data based on data from the first electronic sensor passes through the communications module while the gatekeeping function is enabled, wherein all data input to the gatekeeping module is received via an exclusive input lead from the first electronic sensor, and wherein all data output from the gatekeeping module is transmitted via an exclusive output lead to a component other than the first electronic sensor. The processor determines that user input comprises a first input content and in response automatically transmits a message to the computing device.

16 Claims, 13 Drawing Sheets

Related U.S. Application Data of application No. 15/812,679, filed on Nov. 14, 2017, now Pat. No. 10,002,259.

(51) Int. Cl.

| | | |
|---|---|---|
| *H04W 12/02* | (2009.01) | |
| *G06F 21/62* | (2013.01) | |
| *H04W 12/00* | (2009.01) | |
| G06F 3/16 | (2006.01) | |
| G06F 3/01 | (2006.01) | |
| H04L 29/06 | (2006.01) | |

(52) U.S. Cl.
CPC .............. *H04W 12/02* (2013.01); *G06F 3/017* (2013.01); *G06F 3/167* (2013.01); *H04L 63/0861* (2013.01)

(56) References Cited

U.S. PATENT DOCUMENTS

| | | | |
|---|---|---|---|
| 6,804,396 | B2 | 10/2004 | Higaki et al. |
| 7,106,843 | B1 | 9/2006 | Gainsboro et al. |
| 7,340,077 | B2 | 3/2008 | Gokturk et al. |
| 7,444,000 | B2 | 10/2008 | Rhoads |
| 7,760,905 | B2 | 7/2010 | Rhoads et al. |
| 7,840,031 | B2 | 11/2010 | Albertson et al. |
| 8,090,961 | B2 | 1/2012 | Yoffe et al. |
| 8,522,309 | B2 | 8/2013 | Yoffe et al. |
| 8,638,989 | B2 | 1/2014 | Holz |
| 8,723,789 | B1 | 5/2014 | Ratii |
| 8,745,541 | B2 | 6/2014 | Wilson et al. |
| 9,024,842 | B1 | 5/2015 | Prada Gomez et al. |
| 9,357,320 | B2 | 5/2016 | Getter |
| 9,472,206 | B2 | 10/2016 | Ady |
| 9,697,828 | B1 | 7/2017 | Prasad et al. |
| 9,747,884 | B2 | 8/2017 | Lehmann |
| 10,354,648 | B2 | 7/2019 | Christopher |
| 10,616,411 | B1 | 4/2020 | Chang et al. |
| 2008/0168290 | A1 | 7/2008 | Jobs et al. |
| 2009/0103169 | A1 | 4/2009 | Kokeguchi |
| 2010/0066676 | A1 | 3/2010 | Kramer et al. |
| 2010/0125816 | A1 | 5/2010 | Bezos |
| 2010/0306713 | A1 | 12/2010 | Geisner et al. |
| 2011/0032184 | A1 | 2/2011 | Roche et al. |
| 2011/0173204 | A1 | 7/2011 | Murillo et al. |
| 2011/0173574 | A1 | 7/2011 | Clavin et al. |
| 2011/0185309 | A1 | 7/2011 | Challinor et al. |
| 2011/0291926 | A1 | 12/2011 | Gokturk et al. |
| 2011/0301934 | A1 | 12/2011 | Tardif |
| 2013/0074002 | A1 | 3/2013 | Markovic et al. |
| 2013/0159939 | A1 | 6/2013 | Krishnamurthi |
| 2013/0231930 | A1 | 9/2013 | Sanso |
| 2013/0278501 | A1 | 10/2013 | Bulzacki |
| 2014/0222436 | A1 | 8/2014 | Binder et al. |
| 2014/0278435 | A1 | 9/2014 | Ganong, III et al. |
| 2015/0221307 | A1* | 8/2015 | Shah ............ G10L 15/28 704/253 |
| 2015/0279366 | A1 | 10/2015 | Krestnikov et al. |
| 2016/0253149 | A1 | 9/2016 | Iyer et al. |
| 2017/0004293 | A1 | 1/2017 | Mantri et al. |
| 2017/0148444 | A1 | 5/2017 | Bocklet et al. |
| 2018/0329512 | A1 | 11/2018 | Liao et al. |
| 2019/0043466 | A1 | 2/2019 | Masterson et al. |
| 2019/0074002 | A1* | 3/2019 | Christopher ......... G10K 11/175 |
| 2019/0287529 | A1 | 9/2019 | Christopher et al. |

* cited by examiner

INFORMATION SECURITY/PRIVACY VIA A DECOUPLED SECURITY ACCESSORY TO AN ALWAYS LISTENING ASSISTANT DEVICE

CROSS REFERENCE TO RELATED APPLICATIONS

This application is a continuation-in-part of co-pending U.S. patent application Ser. No. 16/010,725, filed Jun. 18, 2018, titled "SECURE AND PRIVATE PROCESSING OF GESTURES VIA VIDEO INPUT," which itself is a continuation-in-part of U.S. patent application Ser. No. 15/812,679, filed Nov. 14, 2017, titled "INFORMATION SECURITY/PRIVACY IN AN ALWAYS LISTENING ASSISTANT DEVICE," and granted as U.S. Pat. No. 10,002,259 on Jun. 19, 2018, each of which is hereby incorporated by reference in its entirety.

FIELD OF INVENTION

This application relates to methods and systems for security and privacy of user input, including audible speech or visible gesture input, and performing an assistive response to the user input via an "always-listening" medium.

BACKGROUND

Many devices or software solutions are currently marketed to consumers as "always listening," including Amazon Echo® (a.k.a. Alexa™), Google Home™, Apple HomePod™ and Siri® on Apple® devices. However, these devices are configured to always listen for their respective "wake up" words, upon receipt of which the devices will only continue to record additional speech for a period of time (e.g., a single complete command, string or query proceeding their wake up words, ending with a pause). These wake up words let the devices know when a command or query is directed to these devices such that the immediate proceeding speech data is captured and processed; and no other speech data is intended to be recorded or sent to the cloud in any way, shape or form, in order to safeguard the security and protect privacy of audible data spoken by users.

The current "always listening" devices would more appropriately be termed "always listening for a wake up word," and are, in fact, inactive and dormant in response to most speech, rather than "always" analyzing and determining a response to received speech and commands.

Further, these devices only respond by complying with a single command or responding to a single query; they are unable to comply or intuitively follow a series of commands or queries due to the limitations of the current systems and methods of "listening."

Current market-available solutions for protecting data use a physical button on the surface of the device to provide users complete control over the microphone and whether these devices can listen at all. Requiring a manual button to ensure enabling and disabling the microphone is inconvenient when consumers expect voice-only control, and is not a satisfactory solution. Device manufacturers primarily offer it for the users' peace of mind.

Some systems control "always listening" status by software means, which are always at risk of external digital intruders hacking in and stealing audible or speech data from the microphone.

Consumers are unlikely to trust that these devices and security protocols will completely protect their privacy, especially if there is no direct speech control provided over the "always listening" function.

The current methods of using "wake up" words and security software protocols are time and labor intensive to constantly develop, maintain, and improve—while still failing to achieve guaranteed security of muting the device when a user so desires.

Most current technological focus has been emphasized on improving the mechanics or the "how-to's" of detecting audible speech, improving accuracy and offering "faster responses"—where the latter has been focused on pre-defining rules and programs to respond to queries or pre-analyzing past behaviors which is extremely limited given the vast possible variety of queries and commands or desired assistance that millions of users would have, each more than likely to be unique.

Device makers and other advertisers compete to balance delivering the most desired assistance at the most applicable timing, with the most subject relevancy, based on user need and receptiveness, while being perceived by the user as non-intrusive and non-disruptive.

SUMMARY OF THE INVENTION

An always-listening-capable decoupled accessory for a computing device having a communication module is disclosed, comprising a first electronic sensor, configured to record user input comprising an utterance or gesture, a data connection to the computing device, a gate-keeping module implemented by a processor, and non-transitory memory. All data received by the communications module based on data from the first electronic sensor passes through the gate-keeping module while a gatekeeping function is disabled, wherein no data based on data from the first electronic sensor passes through the communications module while the gatekeeping function is enabled, wherein all data input to the gate-keeping module is received via an exclusive input lead from the first electronic sensor, and wherein all data output from the gate-keeping module is transmitted via an exclusive output lead to a component other than the first electronic sensor. The non-transitory memory stores instructions that, when executed by a processor, causes a processor to determine that user input recorded by the first electronic sensor comprises a first input content; and in response to determining that the user input comprises the first input content, automatically generate and transmit a message to the computing device.

A method for controlling a computing device having a communication module, using an always-listening-capable decoupled accessory, is also disclosed. The method comprises determining that user input recorded by a first electronic sensor of the accessory comprises a first input content; and in response to determining that the user input comprises the first input content, automatically generating and transmit a message to the computing device. The accessory comprises a data connection to the computing device; and a gate-keeping module implemented by a processor, wherein all data received by the communications module based on data from the first electronic sensor passes through the gate-keeping module while a gatekeeping function is disabled, wherein no data based on data from the first electronic sensor passes through the communications module while the gatekeeping function is enabled, wherein all data input to the gate-keeping module is received via an exclusive input lead from the first electronic sensor, and wherein all data output from the gate-keeping module is transmitted via an exclusive output lead to a component other than the first electronic sensor.

DETAILED DESCRIPTION

An improved method, apparatus and system for protecting audible data are disclosed herein, including a microphone or camera (herein referenced as "receiver") incapable of receiving electrical signals from sources external to the device (but remaining capable of transmitting electrical signals and data), and may be one or more independent processor(s) incapable of receiving external electrical signals (while capable of receiving data) or gate keeping module embedded on a bi-directional processor where the gate keeping module resides where the gate keeping module is incapable of receiving external electrical signals (remaining capable of transmitting electrical signal and receiving data from a receiver), where the gate keeping module or independent processor (incapable of receiving external electrical signals) may act as a localized preprocessor to preprocess a user's voice command prior to enable or disable truly "always listening" of the electronic device. Localized, unhackable control to turn on and off true always-listening via voice command are thus provided. This preprocessor or preprocessing (or gate keeping) function may be capable of directly relaying audible data to a wireless communication module, or to the primary processor to perform other processing functions such as end-to-end encryption before relaying the then encrypted audible data to a wireless communication module; which then may connect to a remote computer (e.g., cloud servers or computing platforms). In essence, the preprocessor/gate keeping module acts as the unhackable "valve" of one-way communication that feeds received data from the receiver to the primary processor or wireless communications component.

The methods described herein utilize a localized preprocessor or preprocessing function on a processor that is incapable of receiving external electrical signals, isolating the "always listening" function and control to a local user, where the control of the gate keeping module is literally without outside data access and thus not susceptible to hacking.

Figure 1:
FIG. 1 depicts software controls in the prior art for the purpose of muting the function for "always listening" for the wake up words "Hey Siri" on an Apple® iPhone®.
Figure 2:
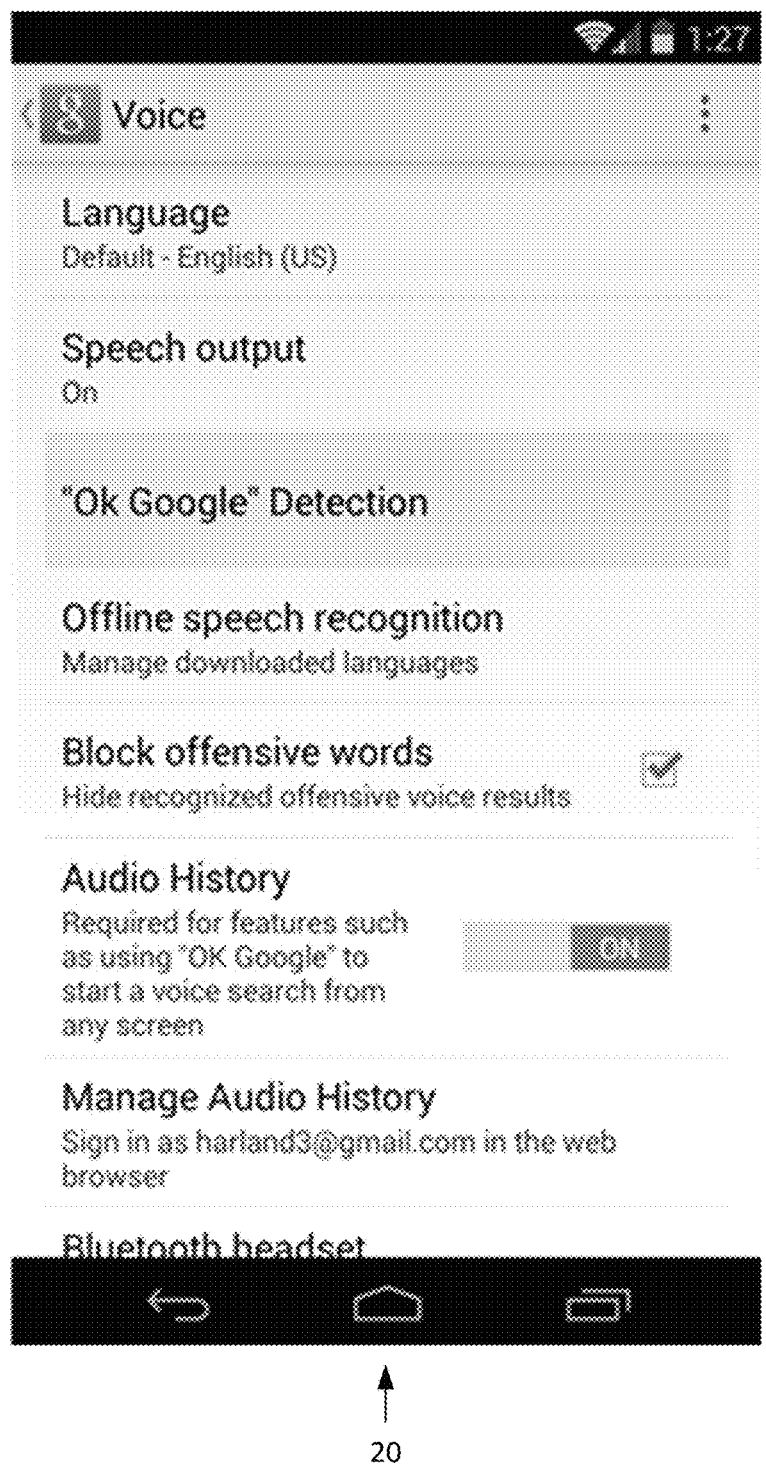
FIG. 2 depicts software controls in the prior art for the purpose of muting the function for "always listening" for the wake up words "Ok Google" on an Android® OS device.
Figure 3:
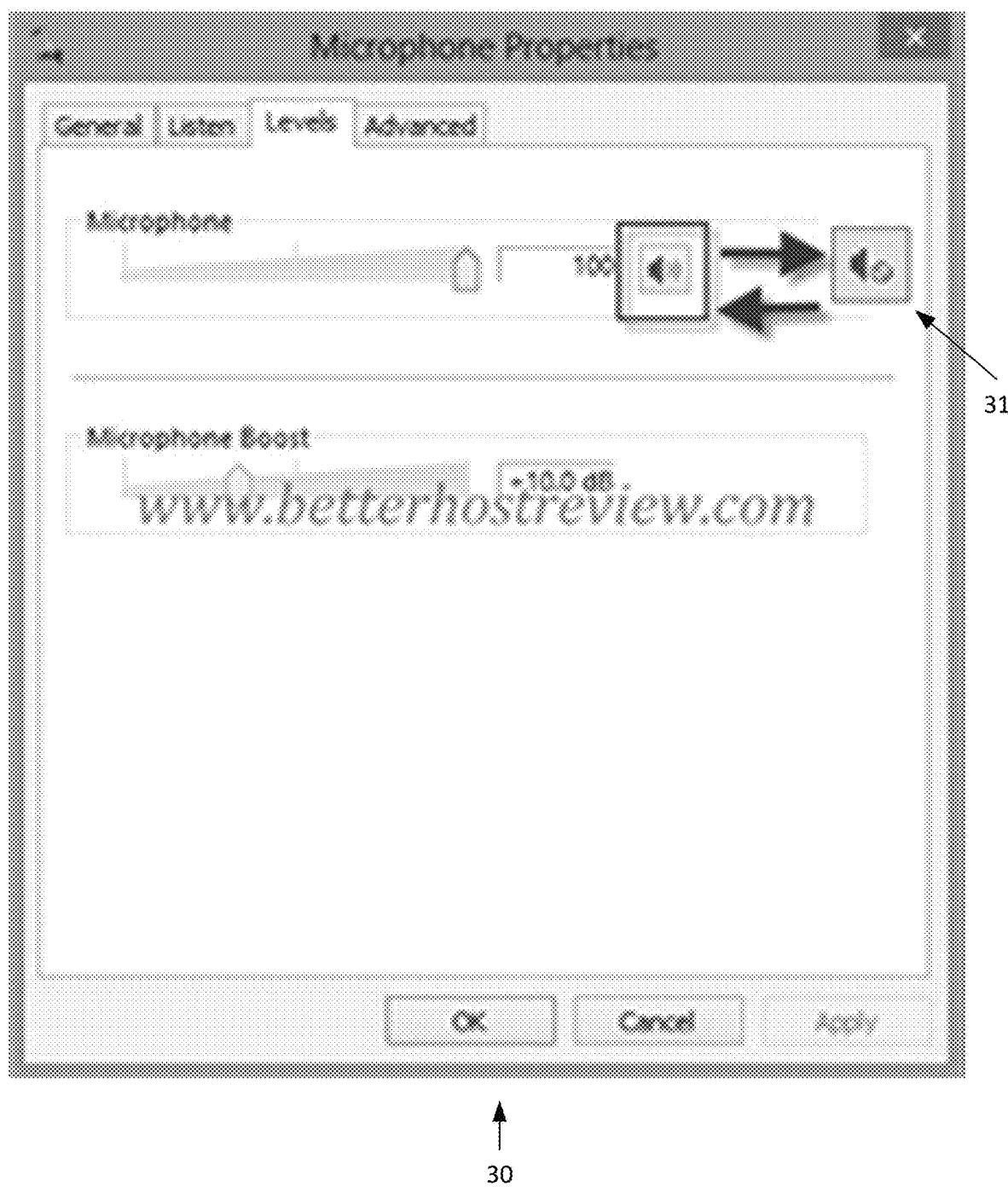
FIG. 3 depicts software controls in the prior art for the purpose of muting the microphone on a Windows® 10 OS.
Figure 4:
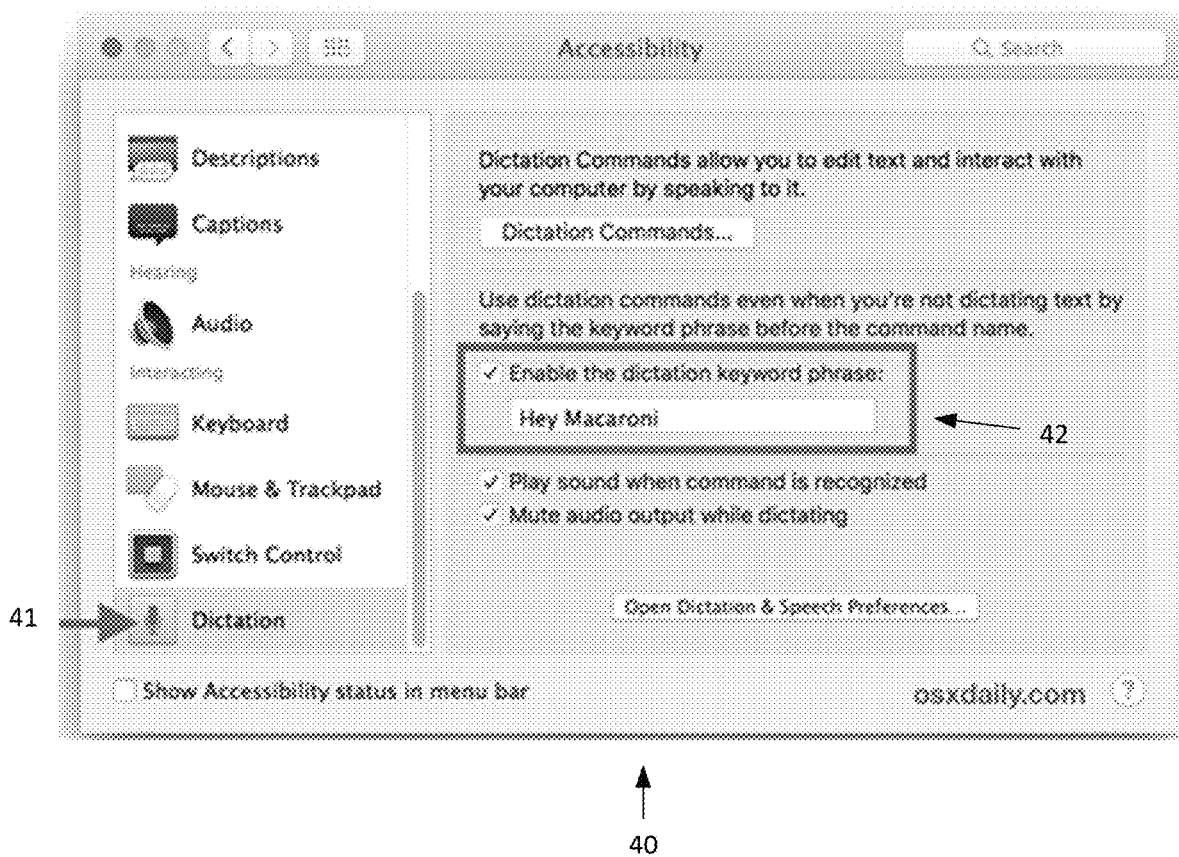
FIG. 4 depicts third party software's prior art functionality for setting a wake up word to command the software to begin dictation.

FIGS. 1-4 depict various software controls in the prior art for controlling the listening and response of a digital personal assistant device. For example, interface 10 of FIG. 1 shows a toggle 11 for allowing the wake up words "Hey Siri" to trigger listening without a physical interaction with the device. Similarly, FIG. 2 displays an Android® interface 20 allowing the words "OK Google" to trigger listening. FIG. 3 displays an interface 30 in a Windows® operating system with a button 31 for disabling microphone input to the system. Finally, FIG. 4 displays an interface 40 in third party software "Dragon® Dictation" for controlling dictation generally, in tab 41 and setting a particular wake up phrase 42 to trigger recording and action.

Figure 5:
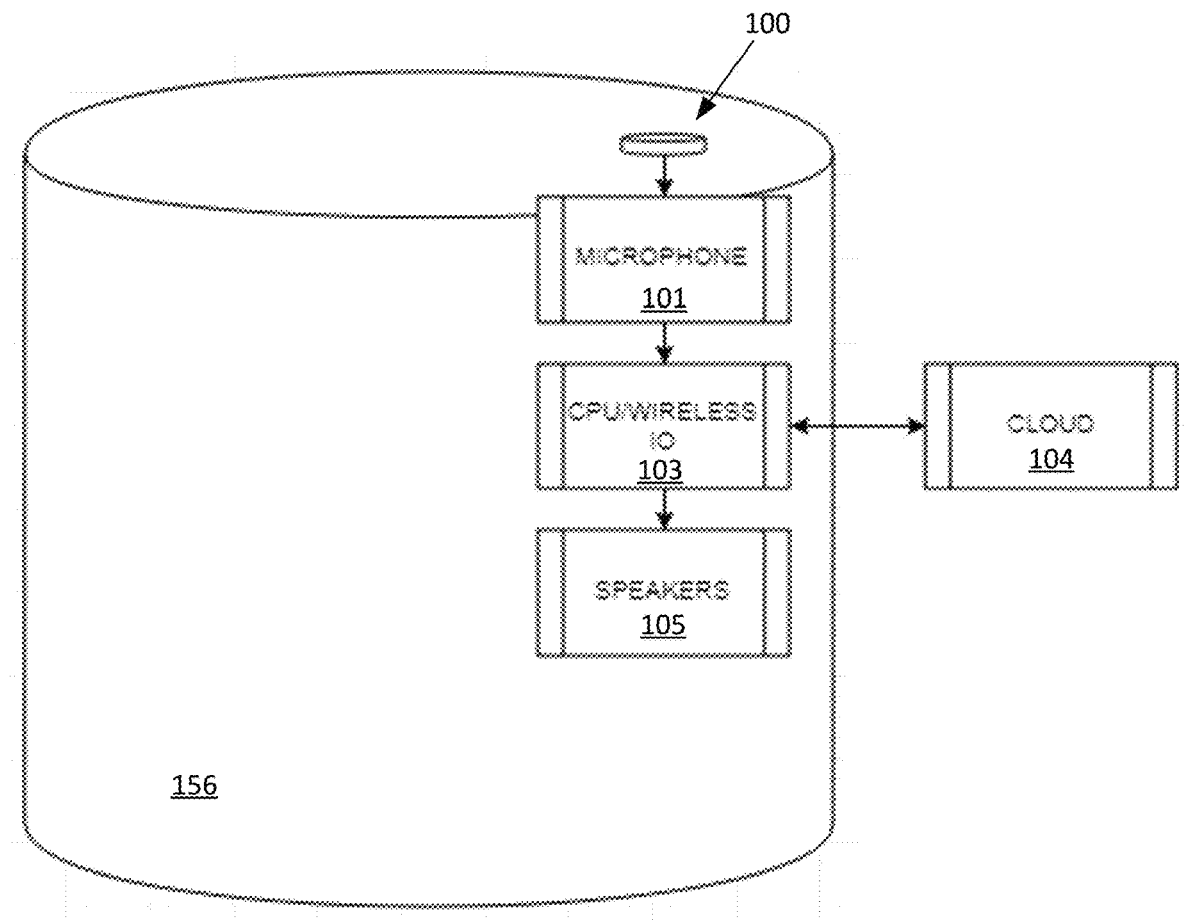
FIG. 5 depicts, in simplified form, the conventional relationship of components within a prior art personal digital assistant.

FIG. 5 depicts, in simplified form, the conventional relationship of components within a prior art personal digital assistant. A user may press a button 100 to physically disable (mute) the microphone 101 from "always listening for a wake up" word. Under normal operating conditions (unmuted), microphone 101 passively listens for a wake up word(s) to detect, and once detected, will record a speech string, query or command immediately following the precursor wake up words to be sent to the processor and/or wireless I/O component 103. Once the string is received by the processor or wireless I/O component 103, the singular string is in most cases transmitted to a cloud server 104, or processed locally if the processor stores a set of preprogrammed executable instructions such as, for example, "turn off <name of> light." The processor/always listening device then returns to passively listening for the precursor wake up word(s). If the string is transmitted rather than processed locally, the cloud server 104 processes the string, query or command, and returns a response to the first processor/ through the Wireless I/O component 103. The response is then processed to actually comply with a command, or play an audible response through the speakers 105.

Figure 6:
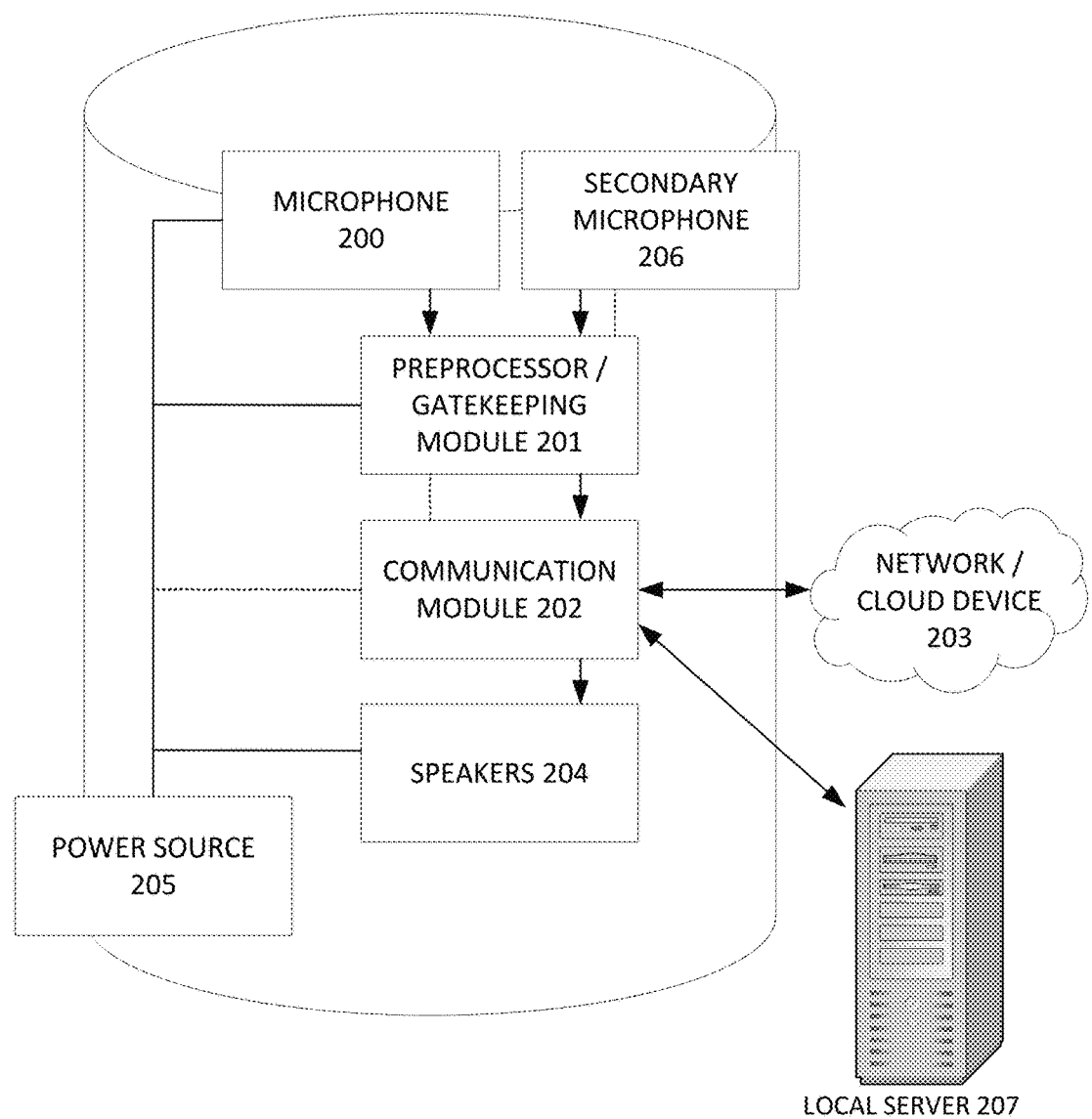
FIG. 6 depicts, in simplified form, an embodiment of an "always listening"-capable electronic device.

FIG. 6 depicts, in simplified form, an embodiment of a truly "always listening"-capable electronic device. The device could alternatively be described in other embodiments as "always receiving," "always watching," "always recording," "always transmitting," and/or any other method of sensing and recording input from sensors, whether those sensors are microphones, cameras, or other electronic devices capable of capturing information about the environment.

Microphone (or camera or other receiver) 200 may be configured to always be listening (or recording, or monitoring sensory feeds other than audio input) for potential instructions from a user, including, but not limited to, activating an always listening mode, deactivating an always listening mode, activating or deactivating features of an underlying digital personal assistant system, or providing digital personal assistant services such as responding to verbal queries. Recorded audio, video, or other data may be transmitted from receiver 200 to a preprocessor and/or a gate keeping module 201.

In some embodiments, the device may comprise two or more distinct receivers. The first receiver 200 may be powered on and monitoring for user input so long as the device is powered, but may have no data leads to the device's communications module 202, and thus may be prevented from communication with remote servers or other outside devices. Data output from the first receiver may be sent only to a processor with limited language processing ability and/or a gatekeeping module 201. The second receiver 206 may normally be powered down or cut off from data transmission, with power being restored or data transmission functionality being restored only when permitted by the gatekeeping module 201.

The gate keeping module 201 may control or restrict the means of inbound (including but not limited to authorized and unauthorized electrical signals) or outbound data (audio, video, speech, gesture, or other data) at a critical path, component or function of the electronic device. Alternatively, the gate keeping module 201 may permit or deny power from power source 205 (which may be, for example, a battery or a connection to A/C power) to particular components of the device, including (but not limited to) a microphone, processor, and/or communications module (e.g., Wi-Fi, ZigBee, Bluetooth, Near Field Communication (NFC), cellular phone connection, etc.). In some embodiments, the various components are always directly connected to power source 205 (indicated by solid lines in the figure) while others may be either directly connected or connected through the gatekeeping module 201 (indicated by dashed lines in the figure).

The gate keeping module 201 may be implemented as an integrated circuit, a chip on a motherboard, or any other form of hardware solution. Alternatively, the gate keeping module 201 may take on the embodiment of security programming or protocols that are stored on non-transient memories, such as (but not limited to) EPROM (a memory that can only be erased locally and physically by shining a UV light onto the a designed/designated area on the memory chip and cannot be reprogrammed remotely). It should be understood that a person of ordinary skill in the art would be able to apply the gate keeping method as described herein in any number of alternative hardware and/or software embodiments.

The programming/protocols may have a function to limit inbound electrical signals received to a preset size or period of time or based on the most recent activity (e.g., sending a request to a server to load a webpage might permit an electronic device to receive data for a period time or until the webpage is loaded, but when there is no recent data request within a preset period of time, the gate keeping module within the EPROM may prevent additional data to be received by the electronic device through the wireless receiver) to prevent the electronic device from being hacked.

Alternatively, a gate keeping module may be set to "block (or limit) continuous audio transmissions on wireless transmitter," if a gate keeping module-processor does not have local input permissions from a user to continuously transmit.

The gate keeping module may be set to permit microbursts of inbound data during time intervals (e.g., anywhere from picoseconds, to seconds, to minutes) to enable an expected stream of data to be downloaded by the device, to allow checking for push notifications, and to allow reception of responses by a server configured to process user data, but make difficult or impossible a continuous connection needed to gain unauthorized access or "hack" a security loophole, upload malicious data, or perform a denial of service attack. The length of the intervals, or the length of periods of disabled communication between the intervals, may be selected randomly or at fixed intervals (such as, for example, disabling communication for one millisecond every twenty milliseconds, or for one randomly chosen millisecond out of every second). The length of intervals may also be related as a proportion (such as, for example, inbound data being allowed for five times as long, twenty times as long, or any other multiplier of time compared to the interval of time that inbound data is disabled.

The gate keeping module may be designed to allow incoming data connections to the function itself only locally by physical, wired means or by more limited-range wireless means such as (but not limited to) Bluetooth, NFC, etc. The function may be secured by one or more of a password, digital fingerprint (such as a cookie or token) required on a modifying device, or by software requiring physical identification or verification of a user's identity by a user's personal electronic device (e.g., an app on a smartphone or other mobile device) before allowing modification of the function's software. This method of allowing some degree of programming or reprogramming the gate keeping module would allow for beneficial security protocols and updates, not necessarily for "intrusion prevention" but also for "transit" related security and customization. For example, a gate keeping module might be programmed to connect to another cloud computing platform other than one designated and hardcoded by the original manufacturer (e.g., Alexa™/Echo® may be reconfigured to connect to a Microsoft® platform by identifying a new IP addresses to which audible speech is permitted to be sent).

The gate keeping module may also be programmed and/or updated regularly by predetermined software, such as (but not limited to) a smartphone "app." In some embodiments, the device may be reprogrammed to use a VPN (Virtual Private Network) to relay the audible speech or gesture data to a server processor in the cloud. Alternatively, the device may be programmed to select from among a set of possible IP addresses, based on load-balancing or traffic-balancing considerations. A security feature may be added to have a two-point verification of encryption and/or malicious code passing as or through as audible data or gesture data uploaded.

Alternatively, a gate keeping module or processor may be programmed to forward received data to a local preprocessor. For example, received speech or gesture data could be forwarded to a local server 207 on the same wireless network as the device, or to a smartphone app, instead of to a remote server. In this way, information privacy and security can be ensured, and may also allow operation in some capacity even if the wireless network's connection to the greater internet is lost.

In another embodiment, a digital personal assistant may comprise a plurality of processors where the wireless communication component is limited to receive externally-originated inbound data and transmitting the inbound signal to a first processor only, the first processor being unable to transmit signal to the wireless component and only able to transmit signals to a display or speaker. Further, the wireless communication component may be limited to only receive outbound (received input) data from a second processor (received from one or more receivers) to transmit to a remote computing device; thus, rendering the receivers unable to be overridden by digital intruders.

Purely local processing of speech and gesture data may enable more secure applications related to security and privacy. For example, if a home security system is controlled by speech, gestures, facial recognition, or other video or audio inputs that require processing, local processing may be preferred to remote processing that might allow a remote hacker to disable the house's security. A private and secure "walkie talkie" or other communication function may be added to operate off the local network and allow communication between multiple devices on the local network.

In some embodiments, the preprocessor 201 may be programmed to allow continuous transmission of all audio or video data received by the receiver by default, and only enforce restrictions on the data transmission in response to particular user inputs.

In another embodiment of the preprocessor(s) and its function, the preprocessor 201 may contain a localized Natural Language Processing (NLP) programming embedded in a non-transient memory tasked with pre-parsing continuous strings of received input by the user into an individually most-comprehensible sub-string.

For example, a user may prefer to make a series of commands without pause, the always listening device and/or its cloud computing unit might not be able to decipher a complex series of commands such as: "Play classical music on Pandora® set volume to four stop playing in one hour turn off bedroom lights set alarm seven A.M." However, utilizing the preprocessor 201 comprised of a pre-parsing NLP may allow analysis and transformation of the string into five individual commands before transmitting to the cloud computing unit:

"Play classical music on Pandora®,"
"Set volume to 4,"
"Stop playing in 1 hour,"
"Turn off bedroom lights," and
"Set alarm 7 A.M."

In response, the cloud computing server 203 may be able to respond respectively in sequence, as normal to its original function and/or continuously:

"Playing classical music on Pandora®."
(Silently actualize change in setting—i.e., Amazon® Alexa™ does not provide
audible feedback on changing volume)
"I will stop playing in 1 hour."
(Actualize the change in setting) "Okay."
"Alarm set for 7 AM."

The pre-parsing of a string may be accomplished at the remote cloud computing unit 203 as well; or in any other configuration where it is accomplished before being introduced to the actual NLP or ASR (Automated Speech Recognition).

In another embodiment, the gate keeping module and/or its associated hardware may be independent, in a device separate from an "always listening" electronic device.

The gate keeping module 201 may comprise Natural Language Processing (NLP) to locally process input from a user.

In FIG. 6, the arrows depict directional flow of data transmissions, both wireless and wired, within the electronic device. As shown, the preprocessor and/or gate keeping module 201 is restricted to single-direction, outbound transmissions. The gatekeeping function 201 may be embedded in either a single-directional processor (i.e., a device or component having only input from the receiver and having only output to a downstream processor) or a bi-directional processor, so long as the gate keeping module is restricted to only a single-directional, outbound transmission. The single-directional feature, if not enforced by the data input/output ports themselves, may be enforced by, for example, software stored in a read-only memory (ROM) and executed by a processor in the gate keeping module 201.

In the illustrated embodiment, the preprocessor and/or gate keeping module 201 relays and protects speech or other video or audio data received by the receiver 200 before transmitting it to the primary processor and/or wireless input/output communications component 202, which transmits the speech data to the cloud or other remote server 203.

The primary processor 202 may encrypt the speech data or otherwise ensure security of the data transmission channel prior to transmission. Alternatively, the encryption may occur at the preprocessor level 201; or both, for a multilayer encryption feature.

The system/component/method may be integrated into various types of electronic devices, such as (but not limited to): mobile phones, tablets, laptops, computers, smart watches, televisions, lighting, media players (e.g., a DVD player, a Blu-Ray player, iPod, etc.), home security systems, smart home devices (such as smart thermostats, smart refrigerators, smart locks/doorbells, etc.). A personal of ordinary skill in the art would be able to apply this invention to a number of other scenarios, applications and methods of integrating an embodiment that would provide added value to the user, device maker, content (and/or advertising) delivery provider, or a combination thereof.

In some embodiments, an integrated gate keeping module without external data inputs can be used to protect video or other types of data feeds that a user might find sensitive and wish to keep secure and private.

In some embodiments, the device may include one or more light emitting diodes (LEDs), whose lighted/unlighted status, color, or pattern of blinking allows the user to visually ascertain whether the always listening mode is on or off. Other visual or auditory effects may be used to indicate the always listening status, including, by way of example, a symbol, icon, or flashing icon on a screen or display of a device, an occasional beep or prerecorded sound to remind the user that the always listening mode is engaged, or any other way of alerting or reminding a user via that user's sensory input that recording is occurring.

While a speaker for device output to the user is preferred, in some embodiments, the device might not include a speaker for output, which may instead be provided by one or more of lights, vibrations, a video screen, or other visual indicator. Alternatively, the device may be both completely silent and unchanging in visual appearance, exclusively performing data transmissions and updates in the background without feedback to the user.

In some embodiments, the device may incorporate one or more sensors in addition to a microphone or camera, including (but not limited to) a vibration sensor (such as a seismograph), global positioning system (GPS), accelerometer or gyroscope for determining orientation, thermometer, humidity sensor, etc. The additional sensor(s) may be used to determine possible user intent even without an utterance or gesture, such as, for example, detecting the vibration of a fallen user, an unsafe temperature in a living area, or other emergency situations.

The "always listening" mode, where and when the capability is enabled by the user, the device and/or its offsite functions (e.g., cloud computing, logic, Natural Language Processor, or artificial intelligence) may listen/receive/record, process, record useful data and ascertaining appropriate times to respond and/or provide assistive details. For example, if a user elects to have "always listening" on, the device may be able to provide a number of useful services based on audio input:

- If a user verbally schedules an appointment (with another user physically present or via telephone), the device may add the appointment to a software calendar associated with the user.
- If a user conversationally inquires to a second user, "Who is that actor?" while watching a movie, the device may attempt to determine the movie and scene being watched, check a data repository of information about the movie, and respond with a best guess/estimate of the identity of the actor.
- If a user speaks to a secondary user or household member to "remind them" of an upcoming event or assigned task, the device may respond appropriately by adding a reminder regarding the event or task to their digital or cloud notes, or adding a mobile phone alert for that secondary user.
- If a user converses with another user or household member on where to go or what to have for dinner, the device may respond with suggestions of nearby restaurants that have paid to advertise, have promotions, etc.;
- If a user asks how far a suggested restaurant is, the device may determine the user's location (via a GPS unit in the device, address from the user's profile, or another means of estimation such as cell tower triangulation) and respond with approximate distance from the user to the restaurant.
- If a user says the restaurant is too far (to the device or to another user), the device may inquire if there is a time or distance parameter the user would like to stay within.
- If users discuss and pause for a period of time after the last time or distance conversation concluded, the device may make an alternative suggestion within any provided parameters or parameters received or determined from the users' discussion.
- If a user(s) discuss and pause for a period of time after a type of food the user(s) would like, the device may make a suggestion within the parameters of the user(s) discussion or instructions.
- If a user(s) discuss and pause after a period of time a movie he/she/they would like to see, the device may provide information on show times, locations, distance or a combination of
- If a user conversationally describes the environmental conditions as being uncomfortable, the device may connect to one or more thermostats, cooling systems, heating systems, fans, or other external environment control devices, transmitting an electronic command to the apparatus' to modify the settings to a more desirable level. Similarly, if a user were to say, "It's too bright in here," the device might transmit a signal to motorized curtains to close or close slightly, or transmit a signal to a dimmer switch to dim the lights to a lower setting.
- If a user describes symptoms of illness, the device may suggest methods of treatment, automatically update a user's medical record for consultation during a future medical appointment, and/or interject, recommending seeking immediate medical attention.
- The user may preprogram the system and/or device to recognize specific "safety" and "emergency-send help" code words or gestures to enhance the security of the user. For example, a code word such as "blue elephant" may be used as an "all-safe" word/phrase (and may be verified with Voice ID) upon entry of a dwelling equipped with an armed security system. Alternatively, a user may configure a specific phrase or gesture to indicate "User under duress—send help!" If an intruder subsequently coerces a user to deactivate a security system, uttering the phrase may cause the security system to enter a false disarm state while alerting the authorities. A third phrase or gesture may be used to immediately trigger the security system, as a "panic" command while the user attempts to escape or hide.

The audio processing functionality may additionally be configured to warn a user of potential spurious or malicious input. For example, if a user may be listening to audio on the radio or streaming via web that comprises a hidden message at a frequency above or below normal human hearing ranges (approximately 20 Hz-40 kHz). Rather than act upon audio recorded by the microphone, a device may be configured to instead audibly or otherwise warn the user that it is perceiving an attempt to issue inaudible commands, and may offer to enter a more secure mode that disables one or more command types, temporarily disable audio input to the device, or temporarily disable audio output by whatever device is generating the audio. Similarly, the system may be trained to recognize voices of a number of members of a household, and determine that an received verbal command either came from a recorded voice in currently-playing audio entertainment, or from a visitor in a household who is not authorized to issue commands to the device. The system may ask for confirmation or refuse to act upon input that cannot be confirmed as originating from an authorized or normal user of the device.

Similarly, a system comprising a camera may be able to provide a number of useful functions based exclusively on video data or on a combination of audio and video data.

- If a user is unable or unwilling to speak (e.g., the user is deaf, is mute, is eating, is in a loud environment and does not want to shout over the sound, etc.), the user may still enjoy the safety and helpfulness of a personal assistant device through custom or language based gesture communications with the device. The system may be configured to recognize microexpressions (such as a smile, frown, gasp, pursed lips, flared nostrils, movement of eyebrows, movement of eyelids, movement of tongue, movement of cheeks, etc.) as well as macroexpressions (waving hands, sets of one or more raised fingers, traditional communication in American Sign Language or other sign languages, etc.). Micro- and macroexpressions can be combined with ascertained information on the volume or content of speech to determine a likely user mood or intent. Information gleaned from these determinations of mood or intent may be used to update a user profile (such as remembering that a user likes a sports team if the user cheers when the team wins, or remembering that a user does not like a food if the user grimaces after eating it).
- The system may additionally be trained to "read lips" or other user intents expressed through micro- or macro-expressions through processing of video data, even when audio data is unavailable or unintelligible. Spoken words may be converted to a query or command and acted upon by the system through analysis of the video data alone, or by supplementing available audio data with video data to read the lips of a speaker.
- If user were to fall to the floor and/or emit a cry of pain or discomfort, the system may inquire as to the well-being of the user, contact a third party such as a family member or friend, or contact an emergency service to direct medical aid to the user. If a user is unresponsive after a fall or injury, the system (if permitted by the user in advance within the systems' settings) may override and access additional video feeds to ascertain the state of the user, and/or forward the video feeds to the third party or emergency service. The system may immediately escalate the situation based on characteristics of a fall, such as falling down stairs or from a ladder, instead of merely falling from a standing position or out of bed. The system may also be able to use video data to detect blood, likely broken bones, or other signs of injury in order to determine a likelihood or severity of injury.

The system may build up a model of the locations of a number of objects in a location through the use of a camera (or triangulate precise locations via multiple cameras), and may use the information to assist a user. For example, if a user is walking around at night, the system may determine that an object is in the user's path which is normally not in that location, and audibly warn "You are about to run into a misplaced chair!" to help the user avoid stubbing a toe or tripping in the darkness. Similarly, the system might track the user's location himself, and warn the user that the user is walking on a different path than usual and may collide with a wall or furniture.

The system may also be able to generate a warning that a theft may have occurred by determining that one or more objects, such as jewelry, electronics, paintings, furniture, etc. are not in a location typical for the model. The determination of a possible theft may also be based on facial recognition and the determination that objects have disappeared after an unfamiliar face was present, or proactively generated based on the presence of an unfamiliar face when a resident family is absent, even if no other objects have yet moved.

The system may determine, using object recognition, that a dangerous or undesirable situation is occurring. For example, a child may be determined to be holding a knife, firearm, other sharp or explosive object, a choking hazard, an expensive and fragile item, or other object to which the child should not have access. In response, an alert may be generated and sent to a parent or other caretaker of the child. Automatic detection of other undesirable or unsafe situations, such as a teenager possessing drug paraphernalia, or an adult whose movements indicate that he may be under the influence of alcohol while holding car keys, may generate alerts to an appropriate recipient who can act to address the situation.

The system may determine a final intent of an ongoing user action and offer to contact help if the action is taking a length of time determined to be anomalous for the action type. For example, a person determined to be working with tools in a bathroom or under a sink may be prompted with contact information for a local plumber after one hour has elapsed. A person holding a hammer, wrench, screwdriver, or other hand tool in a living room or bedroom may be prompted with contact information for a local handyman or carpenter after a predetermined period of time has elapsed. A person who is in proximity to an automobile for a period of time without getting into the automobile and leaving may be prompted with contact information for a mechanic, towing service, or other auto service company.

The system may also provide help during an ongoing process. For example, the activities of a person in a kitchen may be tracked as they cook a recipe, so that if they pause for a period of time, they are automatically audibly prompted with the next step of the recipe without having to consult the cookbook or website whose recipe they are using. The current step of the recipe can be determined by cross-indexing video recognition of the user's actions with the user's search history or the determination of a page of the cookbook that the user previously consulted. In another embodiment, a teacher of a class or a parent of multiple children might instruct a group of pupils/children to undertake a particular task or craft project. The system may track the current actions of each person and be ready to interject with help or notify the teacher/parent if the person expresses confusion, frustration, or appears to be undertaking actions inconsistent with a description of the activity that may be entered or preconfigured into the system.

The system may use observed user actions to generate reminders, update shopping lists, or add items to an online shopping cart. For example, if a user pours a bowl of cereal and then fails to find milk and expresses surprise, sadness, or disgust, milk can automatically be added to a shopping list, or an automatic reminder may be generated and transmitted to the user's mobile device when the user is in a grocery store, or a message may be transmitted to another member of the household who is currently outside the house and may buy the milk on the way back. Similar determinations may be made that the household needs to buy a light bulb (in response to a video determination of reduced lighting and/or overhearing a user say that they cannot find a lightbulb), diapers or other baby supplies, or any other good that may be regularly bought and depleted by a household.

A user may be given fine-grained control over how video data received by the device or system may be provided to third parties. For example, the gatekeeping module may be configured to always blur the entire body, or face, or parts of the body except the face, or any exposed skin, before allowing external transmission. Particular parts of the body, such as hands, feet, and/or face may be preserved or isolated for transmission, so that other background information is not transmitted. Background information such as the room, furniture, video screens, documents, or other objects may be specifically excluded or included in any video transmitted external to a device.

Embodiments controlling the continuous transmission of video content may be useful in an industrial/commercial scenario—for example, where theft may occur or safety/liability is a concern. In a warehouse implementing an always listening or watching system, the data feed (audio, video or both) may be continuously processed, deciphered and/or analyzed to formulate, retrieve, compute, access, assess or a combination thereof, for a best suitable response to the data such as providing visual feedback through a display or audio feedback through speakers to aid workers, enhance safety or detect unsafe behavior, or alert store or official authorities to break-ins, shoplifting, or theft. Additionally, the system may save received data regarding infractions for training purposes.

Alternatively, the received data used in monitoring infractions may be further used for determining non-moving violations such as illegal parking or exceeding a time limit for parking meters, etc.

A response by the system and method may be passive or active. For example, a passive response would be, in response to an overheard conversation, making an appointment to the user(s) calendar(s); an active response would be providing restaurant suggestions to an overheard conversation of where to go for dinner or order delivery.

Some embodiments may contain one or more displays to provide video on demand or assistance delivery, such as, for example, visual how-to's, advertisements, promotions, coupons or similar video content expected to interest or inform a user of the device.

In some embodiments, other data about a user that comes up in conversation, such as a user's favorite color, favorable or unfavorable opinion on a topic, or other commentary that comes up in conversation, debates, or arguments may be recognized by a processor as not a query or a request to which assistance may be provided. However, the information may nonetheless be archived in a database to allow for better assistance in the future, for example, in response to a request to purchase an item online, purchasing the item in the user's favorite color, or suggesting a book or TV show to watch based on previous commentary by the user. The system may, in some embodiments, learn and store one or more of a user's age, gender, household demographic, products owned, and other information relevant to a user's tastes. Data about users in a household may be anonymized to prevent identification and respect privacy of the users in the case of data breach or other unauthorized access to the data stores.

Audible data collected from a user through an always listening device and the response of assistance might not be restricted to households only. For example, in an industrial or commercial application, audible data collected through an always listening device, may be deciphered and analyzed. If one employee asks another, "Do we have a certain item in stock?", the system may interject in the conversation and audibly respond, "Yes, 123 units are available in the New Jersey warehouse and 234 units are available in the New York warehouse" or "No, but there is an expected shipment due in July 7th." By building up a model and learning the context of conversations held in a particular device's location, responses to ordinary questions can be accurately provided.

Figure 7:
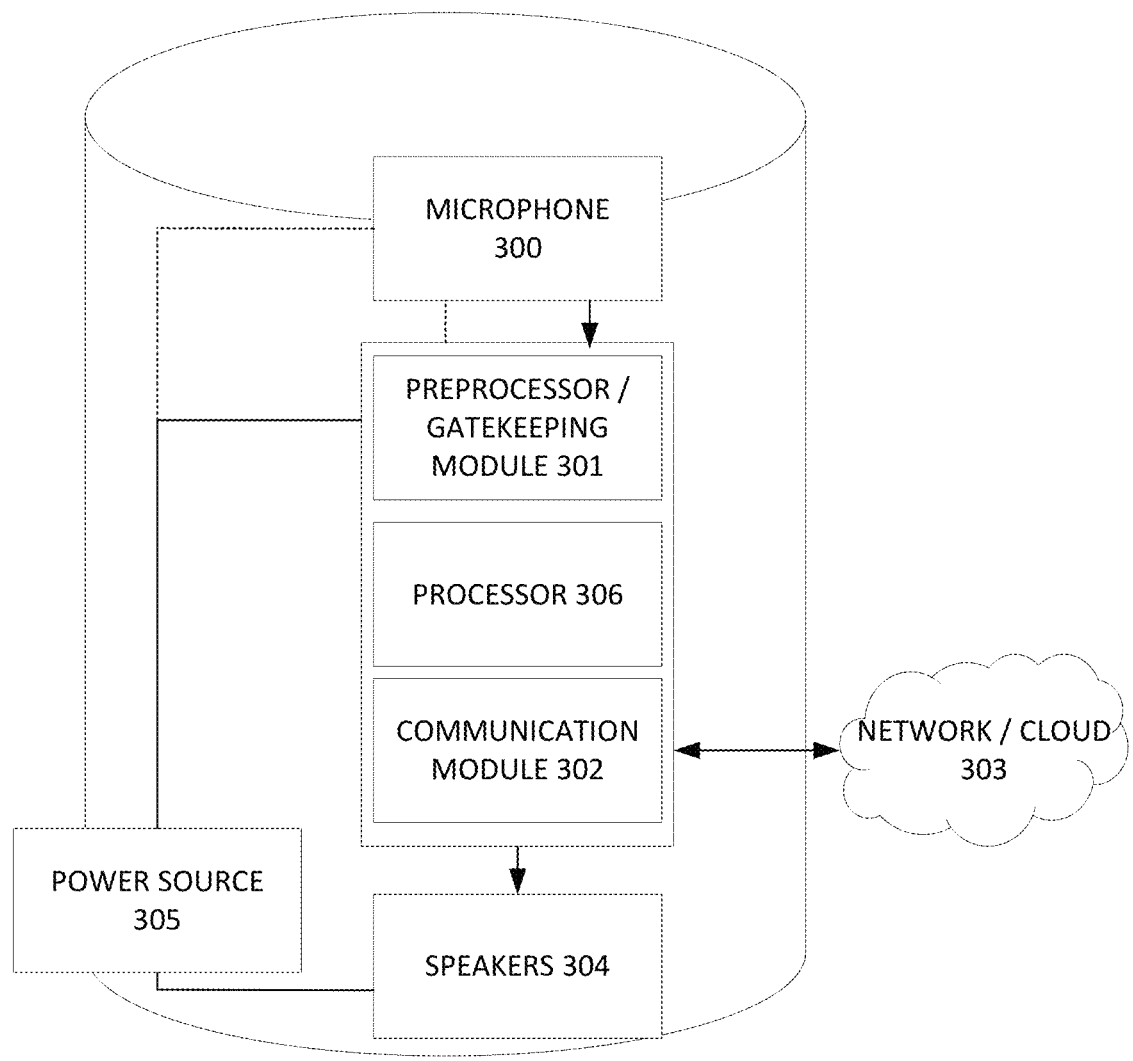
FIG. 7 depicts, in simplified form, an alternative embodiment of an "always listening"-capable electronic device.

FIG. 7 depicts, in simplified form, another embodiment of an "always-listening" device.

In some embodiments, the preprocessor and/or gate keeping module 301 can be integrated together with the primary processor 306 and wireless I/O communication module 302 so long as the preprocessor and/or gate keeping module 301 is restricted to have only single-direction, outbound transmission capability. In this embodiment, the primary processor wireless transmitter/receiver 302 transmits the speech data to cloud or other remote server device 303 and receives a response in turn that may be relayed in the form of audible feedback through one or more speaker(s) 304. Power from power source 305 may still, in some embodiments, only pass to microphone 300 via the integrated gatekeeping module/ processor/communication module, while in other embodiments, the microphone 300 may have a direct power link that is not severable.

Figure 8:
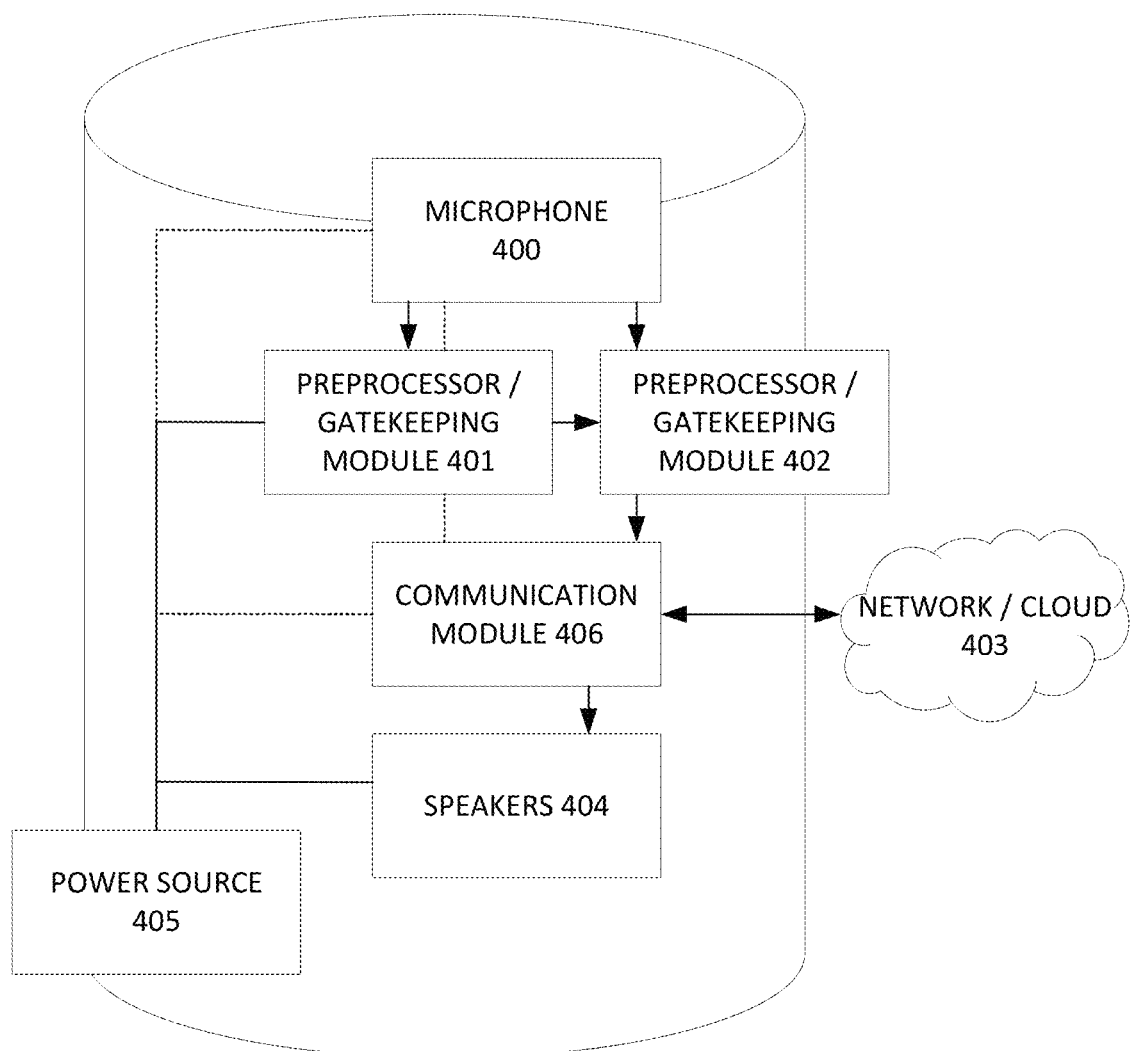
FIG. 8 depicts, in simplified form, an alternative embodiment of an "always listening"-capable electronic device.

FIG. 8 depicts, in simplified form, an alternative embodiment of an "always listening"-capable electronic device.

In some embodiments, a first preprocessor and/or gate keeping module 401 and a second preprocessor and/or gate keeping module 402 may each be passively "always listening" for its own unique wake up phrase. For example, the preprocessor and/or gate keeping module 401 may have the wake up phrase be the word "Alex," whereas the primary processor wake up word may be "Alexa™" (per usual for an Amazon Echo®).

In other embodiments, the wake up phrase may be a particular word, a particular series of words, a hand gesture, a facial gesture, a bodily movement, a tone, a whistle, a pattern of sounds, a pattern of movements, a pattern of taps, or any combination of the above. The wake up phrase may be preconfigured to the device, or may be set by a user to the user's taste.

In one example, if a user says "Alex," followed by a single string such as "allow always listening," the system may respond by allowing continuous listening and transmitting of speech data. Similarly, "Alex" followed by "stop listening" may discontinue listening and transmitting of speech data.

After fulfilling the "stop listening" command, the system may return to a passive mode. The preprocessor and/or gate keeping module may also be integrated or kept independent of a second or primary processor. Further, the wireless I/O or transmitter/receiver may be integrated or kept independent of a processor.

In some embodiments, the first gate keeping module 401 may have control over or communicate with the second gate keeping module 402. For example, if gatekeeping module 401 is added to an existing system that is not fully trusted, a user may be able to use a first wake up phrase to control whether the existing system is able to listen at all, and prevent the existing system from reporting recorded data to a central server.

Figure 9:
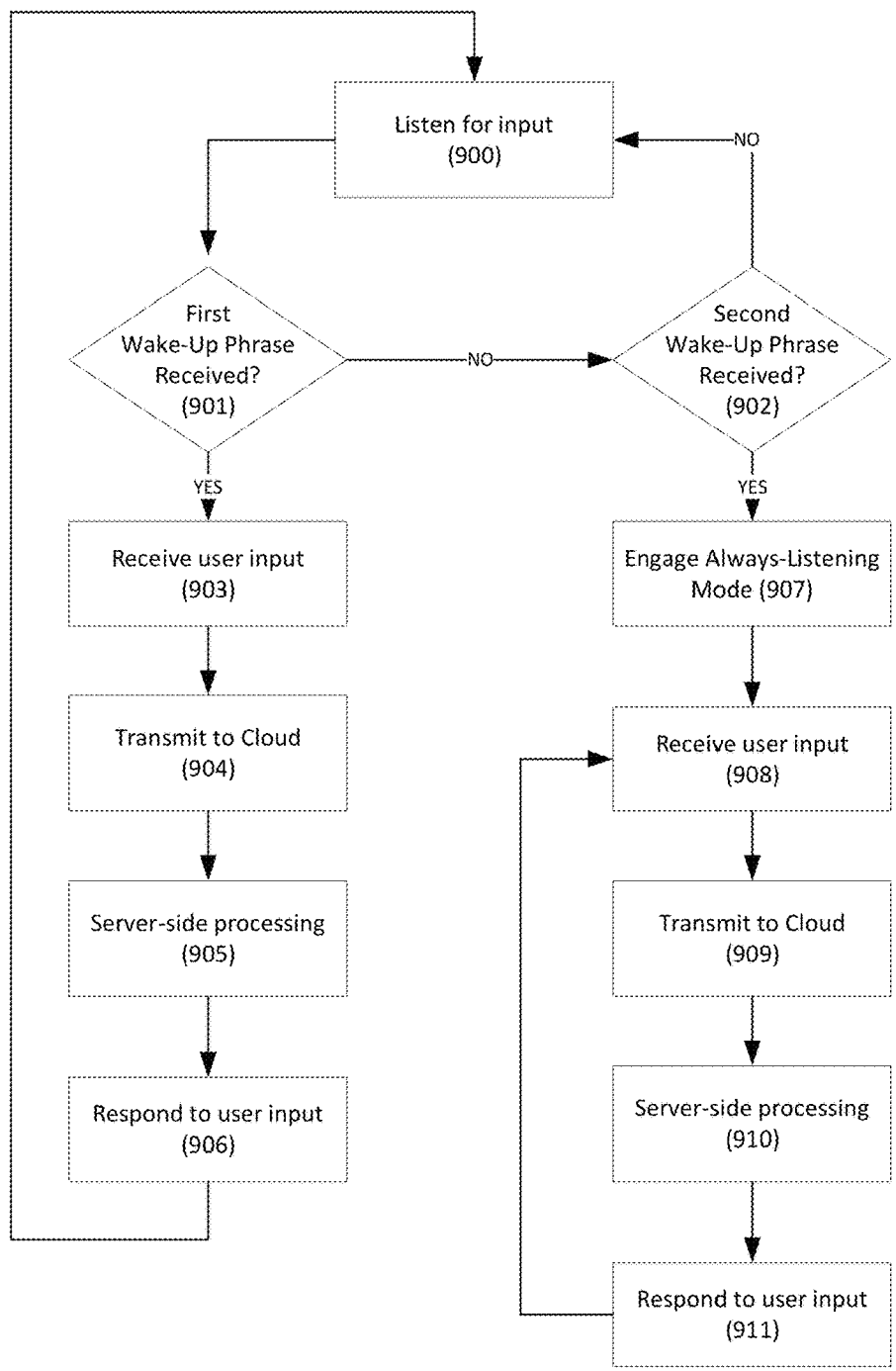
FIG. 9 depicts a flow chart of an illustrative method of processing a second, distinct wake up word.

FIG. 9 depicts an illustrative flow chart of an improved method of processing a second, distinct wake up word.

For example, in the case of an Amazon Echo®, a second wake up word, such as "Alex," could be used in addition to the default "Alexa™." While listening (Step 900), if the first default wake up word is used (Step 901), the standard device behavior is followed.

The next audible phrase after the received wake up word is received (Step 903) and transmitted to the cloud or other remote server (Step 904) for natural language processing (NLP) and a determination by the remote server of the best direct or indirect response to each verbal input or gesture by the user (Step 905). If the proper response is information, speech, music, etc., it is output through the device's speaker(s); if the proper response is an action (e.g., downloading a file, communicating with another device's API, etc.), that action is performed (Step 906). The device then continues to listen again for the first wake up word or gesture (Step 900), process any additional verbal input, and deliver any subsequent assistance to the user.

If, instead, the second wake up word is received (Step 902), the "always listening" mode is engaged (Step 907). The always listening cycle (Steps 908-911) mirrors the conventional series of steps (receive user input, transmit to cloud, determine best response, and effect the response), but in a constant cycle, or even a constant series of multiple concurrent cycles (i.e., receiving a second user input and transmitting it even before the server responds based on the first input), instead of returning to waiting, dormant, for a wake up word, phrase, or gesture. Multiple, asynchronous series of the steps (Steps 908-911) may be in processing simultaneously, and responses may be prioritized in real time based on perceived user need. For example, if a user were to say "I wonder where the nearest Mexican restaurant is. Actually . . . . I think I want Chinese instead," the system might have begun processing the request to determine a Mexican restaurant location, but then received the second statement before making the determination. In response to receiving the second statement, the Chinese restaurant query may be processed and output, in lieu of the Mexican restaurant.

Responses may be prioritized based on any one or more of perceived indicators of urgency (e.g., tone, volume, vocabulary used to indicate importance or danger), emergency or safety concerns, content and subject relevancy, determination of the user's current intent or interest, determining that a user no longer needs assistance, ranking users in a set of users (such as responding first to a device's owner, or to adults over children), subject relevancy, or highest bidder of advertisement. Thus, after the "always listening" mode is engaged by receipt of the second wake up word, the system can become a passive or active participant in the conversation, interjecting to query or provide information, or passively updating calendars or other data stores in response to what is overheard.

Figure 10:
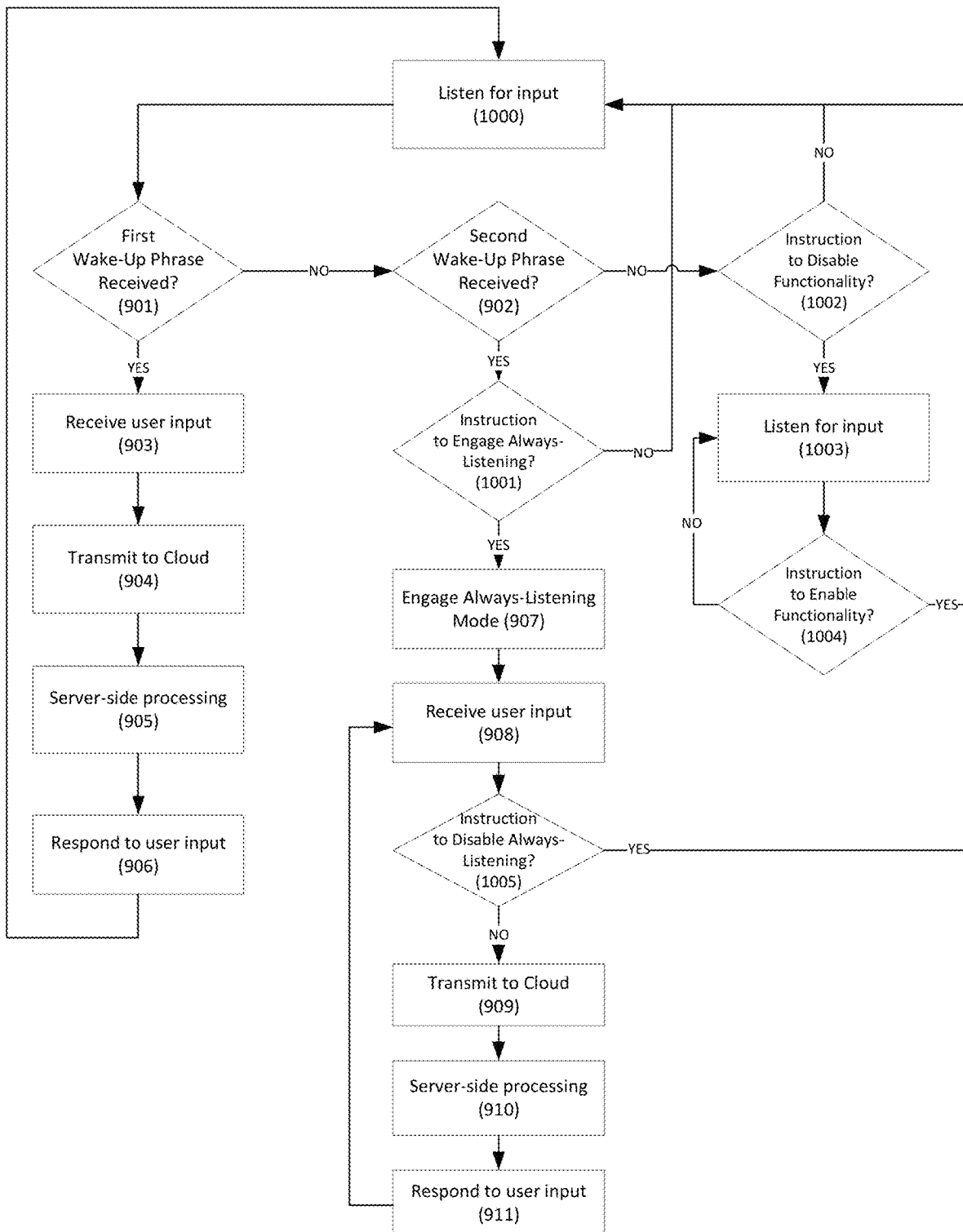
FIG. 10 depicts an alternative flowchart of program logic for additional features of an always-listening device.

FIG. 10 depicts an alternative flowchart of program logic for additional features of an always-listening device.

As in FIG. 9, the system listens for input (Step 1000); if a first wake-up phrase is used, the normal, single-query process may be followed (Steps 903-906), and if a second wake-up phrase is used, in conjunction with a command to engage always-listening mode, the always-listening mode with continuous response to input may be triggered (Steps 908-911). This feature may prevent users from accidentally triggering always-listening mode merely by saying the second wake-up phrase, without confirming their intent, and unwittingly having the device be listening and/or performing actions in the background.

In addition, the always-listening mode should always be listening for an instruction of the user to end the always-listening mode (Step 1005), in which case the system may return to its normal function of listening (Step 1000) in order to enter either a single-query cycle or a multi-query, always listening cycle.

In some embodiments, the system may listen for an additional command to disable one or more parts of the system functionality (Step 1002). The functionality involved may include disabling a microphone or other receiver of the device, disabling a gatekeeping module (to allow data or power to be transferred through the gatekeeping module unhindered), disabling one processor of a plurality of processors, or disabling a communication module for communicating with the cloud or with local devices. The system can then listen for a command (Step 1003) to re-enable the disabled functionality, which, if received (Step 1004) returns the system to its previous function.

The disable functionality/enable functionality cycle (Steps 1002-1004) may instead be included within the flow of either the single-query cycle (for example, between Steps 903 and 904) or multi-query always-listening mode (for example, between Steps 908 and 909).

For example, while in always-listening mode, a command could be issued to turn off one microphone or other receiver used by a multi-receiver device, while leaving another microphone or receiver functional, if, for example, a user does not trust an underlying digital personal assistant receiving data from the first receiver, but does trust a gatekeeping module added to the digital personal assistant and controlled by input from a second receiver.

In contrast to the embodiments described above, integrating a gatekeeping module or chip into a same device that provides assistive response to a user, the functionalities described above (Steps 1002-1004) regarding providing a means for one microphone or other receiver in a multi-receiver system to control the input and output of other receivers and subsystems of the same system may be implemented within decoupled devices that are introduced into an existing always-listening system to provide additional functionalities not present in the system before addition of the decoupled devices, without modifying the software or hardware of devices of the always-listening system directly.

Figure 11:
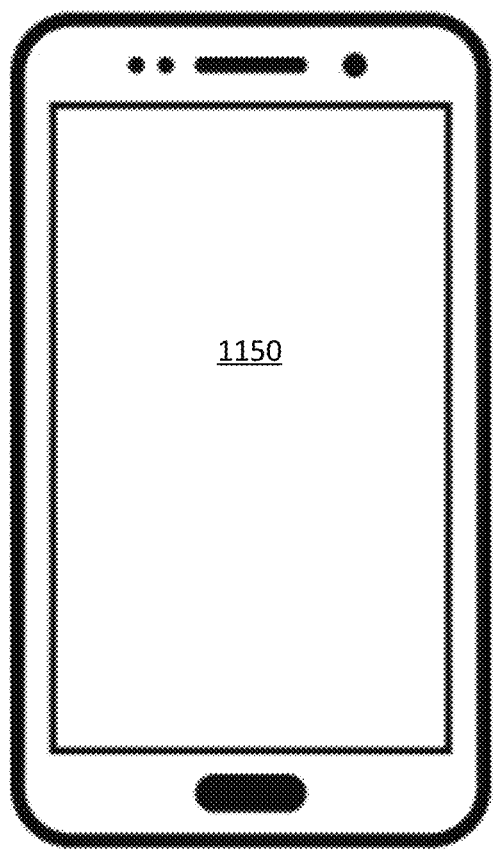
FIG. 11 depicts a decoupled gatekeeping accessory that may be attached to an existing listening device to provide secure, always-listening functionality.
Figure 11:
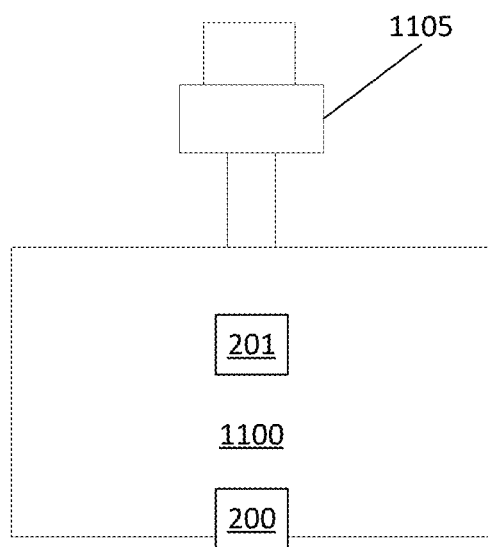

FIG. 11 depicts a decoupled gatekeeping accessory that may be attached to an existing listening device 1150 to provide secure, always-listening functionality.

Existing listening device 1150 may be, for example, a mobile phone having a microphone and assistive voice search built in to the phone's operating system, or may be a commercially available and pre-configured digital assistant such as Amazon's Echo or Google's Home devices.

Accessory 1100 is configured to plug into an external port of existing device 1150 and may include, for example, the gatekeeping module 201 and microphone 200 described previously, as well as an input/output coupling link 1105 configured to fit into the external port.

In a preferred embodiment, the input/output coupling link 1105 may be a cable appropriate for plugging into a 3.5 mm jack (the traditional "headphone" jack) of device 1150. In other embodiments, the input/output coupling link 1105 may be a cable that uses another connection protocol or cable termination type, such as (but not limited to) USB (Universal Serial Bus, types A, B, C, "mini," or "micro"), HDMI (High-Definition Multimedia Interface), VGA, DVI (Digital Visual Interface), Firewire, or other forms of data bus, physical cable connection type, and/or associated protocols for transmission and reception of data. In still other embodiments, the input/output coupling link 1105 may involve a wireless transmitter and establish a connection wirelessly, such as through a Bluetooth, WiFi, NFC (Near Field Communication), or other connection. Accessory 1100 may comprise multiple input/output coupling links 1105 to allow the accessory to function with multiple different types of existing listening device 1150. Similarly, it may allow removal and insertion of new the input/output coupling links 1105 to work with newly developed existing listening devices 1150 via external port types or communication protocols not yet invented, but for which a connection is established either by a software update to a wireless transmitter or a cable with a new external link type at one end and a familiar external link type of accessory 1100 at the other end.

Existing device 1150 may have one or more system APIs that allow an electronic communication to directly disable (e.g., issue a command to a personal digital assistant application itself to pause execution, or terminate, or stop listening temporarily or until a command is issued to re-enable, etc.) or indirectly disable (e.g., at the operating system level, turn off a microphone or other receiver of device 1150 or disable app permissions to access the microphone, etc.) listening functionality of device 1150. Similarly, system APIs may permit re-enabling of system or application features, or allow configuration data or other rules for operation of the listening functionality of device 1150 to be modified.

In response to a user command to stop listening, perceived by microphone 200, gatekeeping module 201 may cause an API command to be transmitted via input/output coupling link 1105 for reception by the operating system of device 1150 or by software of device 1150 that is providing personal digital assistant capability, for processing according to the API to terminate (or make impossible) further listening by device 1150. Consequently, security is enforced by accessory 1100, as an API command to re-enable listening will not be sent by the listening software of device 1150 itself, only by accessory 1100, which remains linked by link 1105 and which will transmit the API command to re-enable only if the user interacts with accessory 1100 and directly or implicitly requests re-enabling of the functionality of device 1150.

Users may distrust device 1150 to refuse to re-enable itself in secret or to have an API that is unhackable by another agent or device sending API calls to device 1150. Accordingly, the use of decoupled devices that place no trust in device 1150, as described below, may be preferable.

Figure 12C:
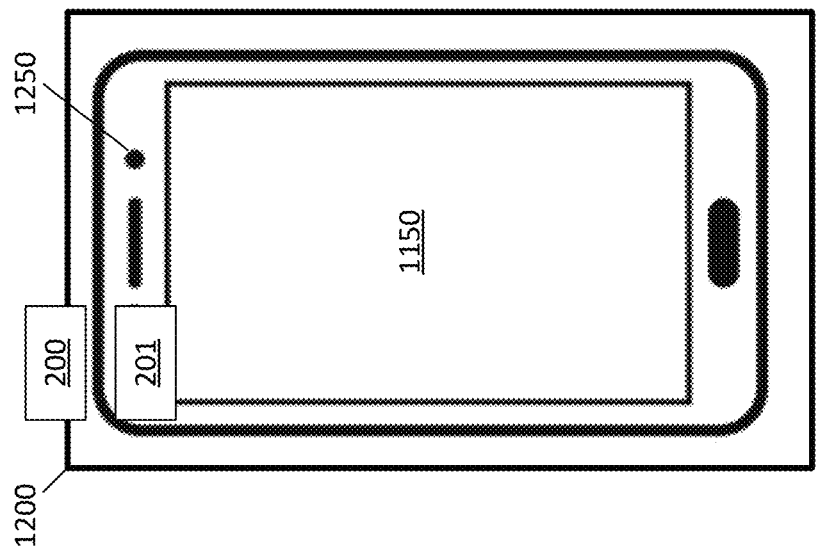
FIGS. 12A, 12B, and 12C depict a decoupled soundproofing or otherwise insulating barrier for assisting in providing secure always-listening functionality.
Figure 12B:
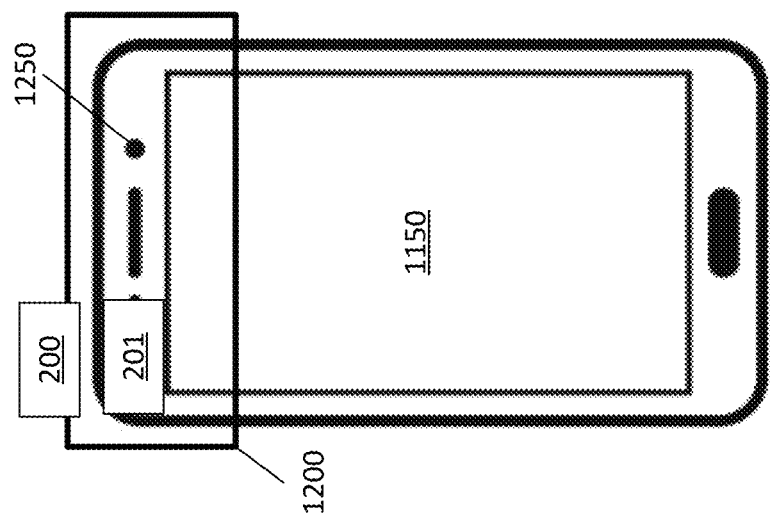
Figure 12A:
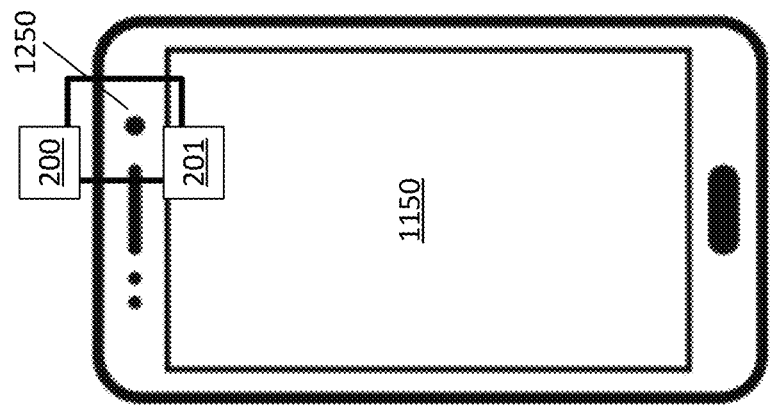

FIGS. 12A, 12B, and 12C depict a decoupled soundproofing cap or otherwise insulating barrier for assisting in providing secure always-listening functionality.

Cap 1200 (which, like accessory 1100, at least includes a receiver 200 and gatekeeping module 201) may be affixed to the independent, always-listening device 1150 such that cap 1200 obscures or interferes with a second receiver 1250 of device 1150.

In one embodiment (depicted in FIG. 12A), cap 1200 may cover a minimal portion of the outer surface of device 1150, as required to obscure or block second receiver 1250 alone, without affecting the rest of the device. For example, as pictured, a camera 1250 of mobile phone 1150 may be covered by cap 1200 without significantly interfering in other functions of mobile phone 1150. In another embodiment (depicted in FIG. 12B), cap 1200 may be a sleeve or cover that surrounds a substantial portion of device 1150, while still leaving at least some surfaces of device 1150 exposed. For example, as displayed in FIG. 12B, a sleeve 1200 fits over the entire top of a mobile phone 1150. In a third embodiment (depicted in FIG. 12C), cap 1200 may be a container that completely encloses device 1150.

In a preferred embodiment, cap 1200 completely insulates receiver 1250 of device 1150 from receiving at least one form of user input. The insulation may take the form of creating a soundproof barrier around a microphone, or an opaque barrier over a camera or other optical sensor, a Faraday cage over a wireless receiver to prevent transmission of signals, etc. Soundproofing may take the form, by way of non-limiting example, of direct blocking with a soundproof material, through acoustic cancelling (generating a waveform that destructively interferes with incoming sound) or imperfectly through interfering with incoming sound via a louder noise, white noise, or other random or pseudo-random noise.

Receiver 200 of cap 1200 may be of the same type as that of blocked receiver 1250, such as including one or more omnidirectional microphones while blocking sound to a microphone, or including a camera while blocking light from being received by a camera or optical sensor. Alternatively, receiver 200 may be of a different type, such that cap 1200 is used to simultaneously block a camera while allowing a user verbal control via microphone 200 and gatekeeping module 201, or block a microphone while allowing a user gesture control via camera 200 and gatekeeping module 201.

Cap 1200 may have an output system that sits within cap 1200 and that corresponds to the input that is blocked from perception by receiver 1250. The output system may thus be used to selectively retransmit sound, video, or other data received by receiver 200 to receiver 1250 within cap 200.

For example, cap 1200 might have three modes of operation: allowing receiver 1250 to receive no data (a default state achieved by the cap); allowing receiver 1250 to receive all data (for example, by receiving audio data with microphone 200 and then recreating the received data via a speaker in the cap); or passing data through to receiver 1250 only when preceded by a separate wakeup word/phrase/gesture/input from one used by device 1150. If the second wakeup input is provided, data may be passed through for a period of time (e.g., until the next user command is performed by device 1150, until one minute has elapsed, until some other predetermined period of time has passed, etc.) or based on another criterion (e.g., pass through only verbal input discussing a certain topic, pass through only verbal input by a particular speaker, pass through only audio data when a person is not speaking, etc.) to allow a user greater control over what data device 1150 has access to.

Cap 1200 may also have a power socket into which a power cord of device 1150 plugs in, or may have its own internal cable (for example, a USB cable) that plugs into device 1150 to provide power. Accordingly, gatekeeping module 201 may use these or other means (including, but not limited to cutting off a power supply, actuating a power button or switch, or engaging with an API of the device) to depower or repower the device.

Gatekeeping module 201 of cap 1200 may have an independent NLP processor or other processor capable of providing assistive responses to user input without needing to transmit to a remote server 203 for analysis and information provision (e.g., for controlling smart appliances in a house, or for storing and retrieving reminders). Gatekeeping module 201 may also be configured to transmit to a server computing device different from remote server 203 for analysis, fulfillment of user intents expressed as input, or updating of stored data. For example, if device 1150 is programmed to transmit to a server operated by a particular private vendor, cap 1200 may be used to redirect input to a server operated by an alternate vendor or by the user himself, in order to protect the privacy of some or all user input data.

Cap 1200 may comprise all or some of the functionality of accessory 1100, including link 1105, so that it not only blocks or provides input to a receiver of device 1150, but can also transmit data directly to device 1150. Accordingly, it is possible for cap 1200 to use speakers or screens of device 1150 or associated with device 1150 (e.g., remote speakers or a screen to which device 1150 is casting content) to pass on received information via link 1105 or to play advertisements via link 1105, so that cap 1200 may have no need for speakers or screens of its own. Cap 1200 may also be used to retrieve and display (alone, or via device 1150) advertisement or other content from a remote server, playing those ads in addition to or in place of ads provided by device 1150.

Figure 13:
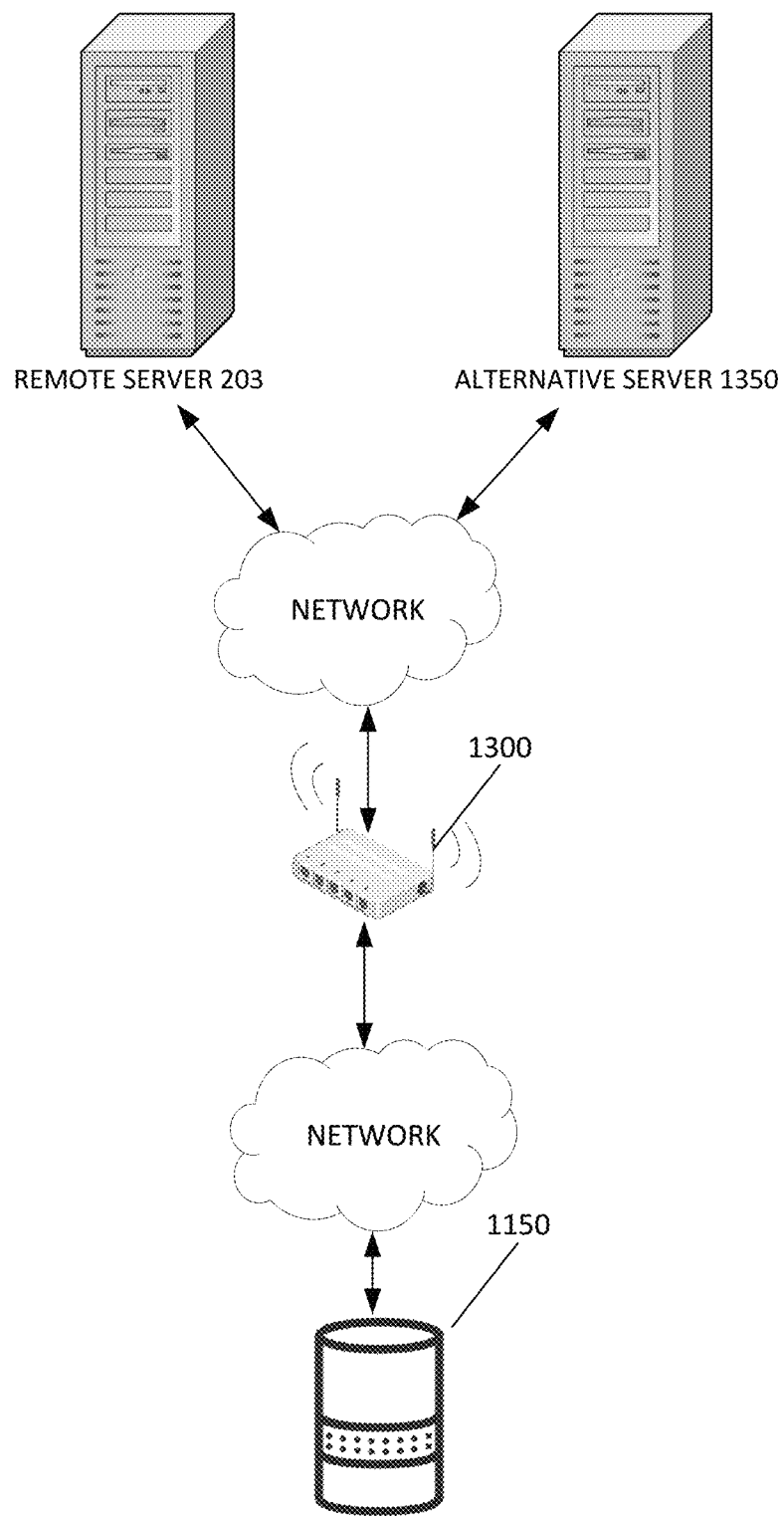
FIG. 13 depicts a system including a decoupled network device for providing secure, always-listening functionality while selectively detouring a portion of a user's generated network traffic to an alternate destination.

FIG. 13 depicts a system including a decoupled network device for providing secure, always-listening functionality while selectively detouring a portion of a user's generated network traffic to an alternate destination.

An always listening device 1150 may be configured to only connect to remote cloud-based server 203 via a network path that necessarily passes through a particular access point 1300, such as—by way of example only—a wireless router, a mobile computing device providing a hotspot with tethering, a wireless signal repeater, a set top box, a desktop computer or other computing device, a network firewall, a network switcher/multiplexer/demuxer, or a cable modem, telephone modem, or satellite or other modem.

Access point 1300 may, based on one or more received commands by a user of device 1150 or rules for interpreting input data received by the user, either prevent the passage of some or all data transmitted by always listening device 1150 from reaching an external network, or alternatively redirect a subset of data transmitted by device 1150 to a separate server 1350 instead of to cloud computing device 203.

For example, a user may configure the device 1150 to connect to the Internet only through a hotspot provided by a mobile phone containing the gatekeeping module 201 within. The user may then download and install a mobile app that uses the gatekeeping module 201 to allow the user to give a voice command to his phone to disable or re-enable functionality of device 1150, which cannot transmit or receive data from external networks without the data passing through gatekeeping module 201.

Access point 1300 may contact an advertisement server 1350 to retrieve contextual or other advertisements and provide them to a user of device 1150. Alternatively, access point 1300 may intercept and delete or replace advertisements that would have been delivered to device 1150 from remote server 203 or another server and displayed by device 1150. Access point 1300 may also be used to select another vendor for services such as text search, instead of a default vendor.

Access point 1300 may be used to implement time-based controls over the transmission of user input data by device 1150. For example, access point 1300 may be used to prevent transmission of user input data from a certain time each night to a certain time each morning, for the duration of a social event like a party, while a user is engaging in a particular activity or consuming particular content, or for a predefined or user-defined period of time after the user issues a command to stop listening.

Access point 1300 may also be used to implement filtering of particular user input data. For example, access point 1300 may be used to filter out all data that does not comprise intentional user commands, all data that does comprise an intentional user command, all data representing input from a particular user, all data representing input from a person other than a particular user, all data concerning a particular topic, all data that does not concern a particular topic, all data that would be handled by a particular application (a calendar app, a web browser, a text messaging app, etc.), all data except that which would be handled by a particular application, etc.

As a result of the foregoing decoupled devices, a user can be provided with additional control over who has access to user actions and data perceived by device 1150, and without having to trust the makers of device 1150 or programmers of software being executed thereon.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed:

1. A decoupled accessory for an always-listening computing device comprising:
   a first electronic sensor configured to record user input comprising an utterance or a gesture;
   a data connection to the always-listening computing device;
   a gate-keeping module implemented by a processor, configured to:
      receive, via an exclusive input lead from the first electronic sensor, a first user input;
      based on a determination that the first user input comprises a first command:
         enable a gate-keeping function, wherein the gate-keeping module blocks data received from the first electronic sensor from passing through the gate-keeping module when the gate-keeping function is enabled; and
         send, via an exclusive output lead to the always-listening computing device via the data connection, a first message, wherein the first message comprises an instruction to disable a functionality of the always-listening computing device;
      receive, via the exclusive input lead from the first electronic sensor, a second user input; and
      based on a determination that the second user input comprises a second command:
         disable the gate-keeping function, wherein the gate-keeping module allows data received from the first electronic sensor to pass through the gate-keeping module when the gate-keeping function is disabled; and
         send, via the exclusive output lead to the always-listening computing device via the data connection, a second message, wherein the second message comprises an instruction to re-enable the functionality of the always-listening computing device.

2. The decoupled accessory of claim 1, wherein the first electronic sensor comprises:
   one or more power input leads; and
   one or more data output leads to the exclusive input lead of the gate-keeping module, wherein the first electronic sensor does not comprise any input leads from or output leads to other components of the decoupled accessory or of the always-listening computing device.

3. The decoupled accessory of claim 1, wherein the gate-keeping module comprises one or more power input leads.

4. The decoupled accessory of claim 1, wherein the functionality of the always-listening computing device comprises at least one of:
   audio capture via a microphone; or
   image capture via an image capture device.

5. The decoupled accessory of claim 1, wherein the data connection to the always-listening computing device comprises a cable.

6. The decoupled accessory of claim 5, wherein the cable is configured to couple to at least one of:
   a 3.5 mm jack of the always-listening computing device;
   a Universal Serial Bus (USB) port of the always-listening computing device;
   a High Definition Multimedia Interface (HDMI) port of the always-listening computing device;
   a Video Graphics Array (VGA) port of the always-listening computing device; or
   a Digital Visual Interface (DVI) port of the always-listening computing device.

7. The decoupled accessory of claim 1, wherein the message is formatted based on requirements of at least one of:
   an application programming interface (API) provided by an operating system of the always-listening computing device; or
   an API provided by an application executed by the always-listening computing device.

8. A method comprising:
   enabling, by a gate-keeping module of a decoupled accessory device connected to a port of an always-listening computing device, a gate-keeping function, wherein:

data input to the gate-keeping module is received via an exclusive input lead from a first electronic sensor associated with the decoupled accessory device, and data output from the gate-keeping module is transmitted via an exclusive output lead to the port of the always-listening computing device;

disabling, based on a determination that the gate-keeping function is enabled, one or more second electronic sensors associated with the always-listening computing device;

receiving, by the gate-keeping module from the first electronic sensor via the exclusive input lead, a first user input; and in response to determining that the first user input disables the gate-keeping function, re-enabling, by the gate-keeping module via the exclusive output lead and to the port of the always-listening computing device, the one or more second electronic sensors associated with the always-listening computing device.

9. The method of claim 8, wherein disabling the one or more second electronic sensors associated with the always-listening computing device comprises:

sending, from the gate-keeping module of the decoupled accessory device to the port of the always-listening computing device via the exclusive output lead, a message comprising an instruction to disable the one or more second electronic sensors.

10. The method of claim 8, wherein the re-enabling the one or more second electronic sensors associated with the always-listening computing device comprises:

sending, from the gate-keeping module of the decoupled accessory device to the port of the always-listening computing device via the exclusive output lead, a message comprising an instruction to enable the one or more second electronic sensors.

11. The decoupled accessory of claim 1, wherein disconnecting the decoupled accessory from the always-listening computing device does not re-enable the one or more second electronic sensors associated with the always-listening computing device.

12. A system comprising:
an always-listening computing device comprising:
one or more first inputs;
a data port; and
one or more first processors;
a decoupled accessory comprising:
a first electronic sensor configured to record user input comprising an utterance or a gesture;
a data connection configured to couple to the data port of the always-listening computing device;
a gate-keeping module implemented by a second processor configured to:
receive, via an exclusive input lead from the first electronic sensor, a first user input;
based on a determination that the first user input comprises a first command:
enabling a gate-keeping function, wherein the gate-keeping module blocks data received from the first electronic sensor from passing through the gate-keeping module when the gate-keeping function is enabled; and
sending, via an exclusive output lead to the one or more processors of the always-listening computing device via the data connection, a first message, wherein the first message comprises an instruction to disable a functionality of the always-listening computing device;
receive, via the exclusive input lead from the first electronic sensor, a second user input; and
based on a determination that the second user input comprises a second command:
disabling the gate-keeping function, wherein the gate-keeping module allows data received from the first electronic sensor to pass through the gate-keeping module when the gate-keeping function is disabled; and
sending, via the exclusive output lead to the one or more first processors of the always-listening computing device via the data connection, a second message, wherein the second message comprises an instruction to re-enable the functionality of the always-listening computing device.

13. The system of claim 12, wherein the always-listening computing device comprises at least one of:
a mobile device; or
a digital assistant device.

14. The system of claim 12, wherein the one or more inputs of the always-listening computing device comprises at least one of:
a microphone; or
an image capture device.

15. The system of claim 12, wherein the gate-keeping module is configured to recognize the command using at least one of: Natural Language Processing or Automated Speech Recognition.

16. The system of claim 12, wherein the first electronic sensor of the decoupled accessory comprises at least one of:
a microphone;
an image capture device;
a vibration sensor;
a GPS system;
an accelerometer; or
a gyroscope.

* * * * *

UNITED STATES PATENT AND TRADEMARK OFFICE
CERTIFICATE OF CORRECTION

PATENT NO. : 10,867,054 B2  
APPLICATION NO. : 16/198573  
DATED : December 15, 2020  
INVENTOR(S) : Xiao Ming Mai Page 1 of 1

It is certified that error appears in the above-identified patent and that said Letters Patent is hereby corrected as shown below:

In the Claims

Column 21, Claim 1, Line 60:
Please delete "module" and insert --module,--

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*